United States Patent [19]
Fisli

[11] Patent Number: 5,617,133
[45] Date of Patent: Apr. 1, 1997

[54] METHOD AND APPARATUS FOR ADJUSTING ORIENTATION OF LIGHT BEAMS IN A RASTER SCANNING SYSTEM

[75] Inventor: Tibor Fisli, Los Altos Hills, Calif.

[73] Assignee: Xerox Corporation, Stamford, Conn.

[21] Appl. No.: 327,872

[22] Filed: Oct. 24, 1994

[51] Int. Cl.$^6$ .............................. G02B 26/08; B41J 2/47; B41J 2/435; G01D 15/14
[52] U.S. Cl. .................. 347/261; 347/241; 347/243; 347/230; 359/218
[58] Field of Search ................................. 346/108, 160; 358/296; 359/204, 218; 347/241, 261, 118, 134, 243, 116, 129, 230

[56] References Cited

U.S. PATENT DOCUMENTS

| | | | |
|---|---|---|---|
| 2,885,924 | 5/1959 | Cahen | 359/637 |
| 4,474,422 | 10/1984 | Kitamura | 359/218 |
| 4,847,642 | 7/1989 | Murayama et al. | 347/118 |
| 4,878,066 | 10/1989 | Shiraishi | 347/243 |
| 4,903,067 | 2/1990 | Murayama et al. | 347/134 |
| 5,157,533 | 10/1992 | Hanamoto | 347/241 |
| 5,179,462 | 1/1993 | Kageyama et al. | 347/230 |
| 5,233,367 | 8/1993 | Curry | 347/243 |
| 5,243,359 | 9/1993 | Fisli | 347/241 |
| 5,341,158 | 8/1994 | Appel et al. | 347/261 |

OTHER PUBLICATIONS

"Laser Scanning For Electronic Printing", *Proceedings of the IEEE*, vol. 70, No. 6, Jun. 1982, pp. 597–618, by John C. Urbach et al.

*Primary Examiner*—Benjamin R. Fuller
*Assistant Examiner*—Raquel Yvette Gordon
*Attorney, Agent, or Firm*—Oliff & Berridge

[57] ABSTRACT

A raster scanning optical system and method emits a first light beam and a second light beam onto a light receiving member. A scanning device has at least one facet for reflecting the first and the second light beams to the light receiving member. A light transmissive plate is located in a path of the first light beam between the first light emitting device and the scanning device. The light transmissive plate adjusts the sagittal direction and the tangential direction of the first light beam by a desired amount so that the first and second light beams are reflected from positions of the scanning device that are closer to each other and parallel in both the sagittal and tangential meridian.

27 Claims, 11 Drawing Sheets

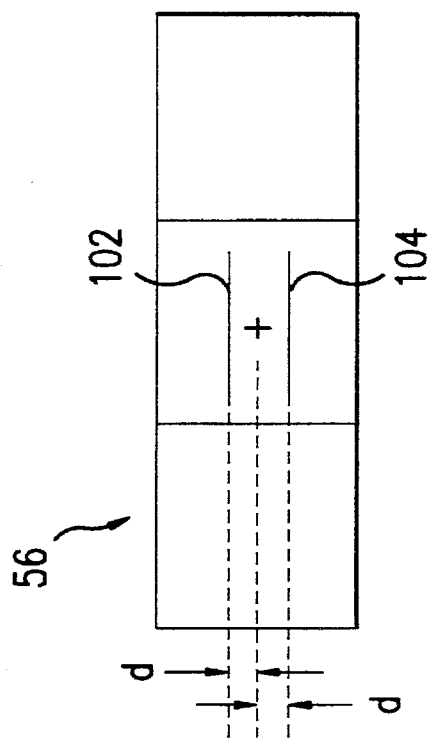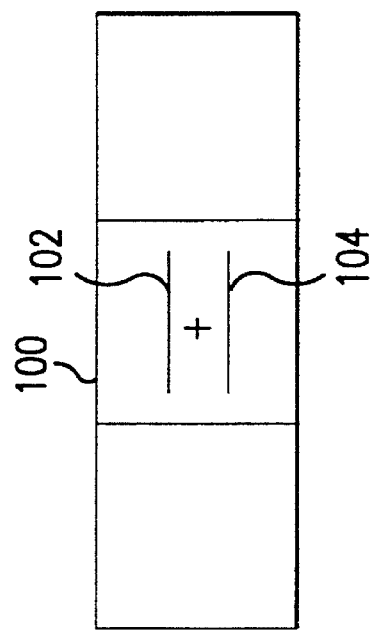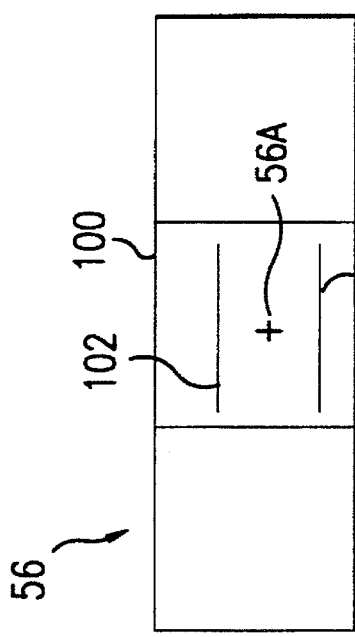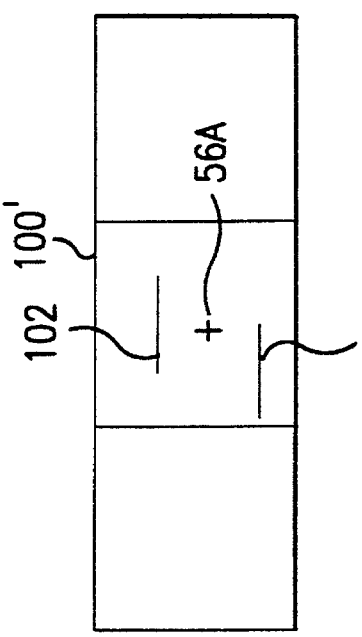

METHOD AND APPARATUS FOR ADJUSTING ORIENTATION OF LIGHT BEAMS IN A RASTER SCANNING SYSTEM

BACKGROUND OF THE INVENTION

1. Field of the Invention

This invention relates generally to an apparatus and method for adjusting the orientation of a light beam in a raster scan system. More particularly, this invention relates to adjusting the sagittal and tangential orientation of a light beam to correct for differential bow.

2. Description of Related Art

Flying spot scanners (often referred to as raster output scanners or ROS) conventionally have a reflective multifaceted polygon mirror that is rotated about its central axis to repeatedly sweep one or more intensity modulated beams of light across a photosensitive recording medium in a line scanning direction (known as the fast-scan or main direction in the tangential direction) while the recording medium is being advanced in an orthogonal, or "process" direction (known as the slow scan direction in the sagittal direction), such that the beams scan the recording medium in accordance with a raster scanning pattern. Digital printing is performed by serially intensity modulating each of the beams in accordance with the binary sample string, whereby the recording medium is exposed to the image represented by the samples as it is being scanned. Printers that sweep several beams simultaneously are referred to as multi-beam printers. Both ROS and multi-beam printer techniques are illustrated in U.S. Pat. No. 4,474,422 to Kitamura (Issued Oct. 2, 1994), the subject matter of which is incorporated herein by reference.

High speed process color or multi-highlight color xerographic image output terminals require multiple independently addressable raster lines to be printed simultaneously at separate exposure stations. This is called multi-station printing. Conventional architectures for multi-station process color printers use a plurality of separate ROSs, usually four independent ROSs, one for each system color, for example, as illustrated in U.S. Pat. Nos. 4,847,642 (Issued Jul. 11, 1989) and 4,903,067 (Issued Feb. 20, 1990) to Murayama et al., the disclosures of which are incorporated herein by reference.

The problems with these systems are the high cost related to the multiple ROSs, the high cost of producing nearly identical multiple ROSs and associated optics, and the difficulty of registering the system colors.

U.S. Pat. No. 5,243,359 to Tibor Fisli (Issued Sep. 7, 1993), the disclosure of which is incorporated herein by reference, discloses a ROS system suitable for deflecting multiple laser beams in a multi-station printer. FIG. 1 illustrates one embodiment of Fisli's multistation printer 10. For the ease of illustration, the numbering of elements in FIG. 1 of the present application differs from the numbering of elements in the Fisli Patent. A rotating polygon mirror 12 simultaneously deflects a plurality of clustered, dissimilar wavelength laser beams, having their largest divergent angles parallel to one another. The laser beams are subsequently separated by a plurality of optical filters 16, 18 and 20 and are directed onto their associated photoreceptors 22, 24, 26 and 28. Similarly dimensioned spots are obtained on each photoreceptor 22, 24, 26 and 28 by establishing similar optical path lengths for each beam. The laser diodes in U.S. Pat. No. 5,243,359 to Fisli are arranged in the slow scan direction (i.e., sagittally offset). Laser diodes oriented in the slow scan direction must be arranged such that they are packed closely in a direction parallel to the polygon mirror's rotational axis to minimize beam characteristic deviations such as spot size, energy uniformity, bow and linearity. Thus, the laser diodes are kept as closely as possible in the direction parallel to the polygon mirror's rotational axis so that the light beams strike nearly the same portion of the polygon mirror as possible.

U.S. Pat. No. 5,341,158 to James Appel et al. (Issued Aug. 23, 1994), the disclosure of which is incorporated herein by reference, discloses a ROS system in which the laser beams are tangentially offset in the fast scan direction (i.e., separated horizontally) to offset diode spacing constraints of U.S. Pat. No. 5,243,359 to Fisli.

FIG. 2 illustrates a prior art dual spot ROS for a single station printer. Such a single station dual spot ROS can be extended into a multi-station dual spot printer. For illustration purposes, FIG. 2 does not show the laser diodes or the pre-polygon optics. These features are well-known in the art and will be described below in detail. FIG. 2 shows two laser beams 31 and 33 being deflected from a rotating polygon mirror 30 and focused onto a photoreceptor 38 using well-known post-polygon optics 32 and 34 and the folding mirror 36. Such dual spot printers simultaneously print two or more spots on the photoreceptor 38 to increase the speed.

Such systems generally use interlace techniques for imaging the plural light beams on the photoreceptor 38. For example, U.S. Pat. No. 5,233,367 to Curry (Issued Aug. 3, 1993), the disclosure which is incorporated herein by reference, discloses one such multiple beam interlacing scanning system. The present invention is preferably used for dual spot printers such as that shown in FIG. 2, although the invention may also be used with the single spot or multi spot multi-station printer such as described in U.S. Pat. No. 5,243,359 to Fisli.

In single spot rotating polygon based optical systems, bow distortions occur from the accumulation of optic tolerances. Bow itself is the curved line described by the scanned laser beam of the ROS as moves in the fast scan direction. Thus, the bow appears as a displacement of the scan line in the process direction as the line extends in the fast scan direction.

Although multi-beam, laser diode based ROS is viewed as the most powerful technology for high quality xerographic printing, differential scan line bow remains an undesirable side effect. Differential scan line bow rises from the very nature of multi-beam optic systems, where the beams are offset sagittally (i.e., in the slow scan direction). The bow occurs because the magnification varies across each sagittal plane as each of the sagittally offset beams propagate through the optical system.

For example, FIG. 8A illustrates three facets of a polygon mirror 56. In the current facet 100, two scan lines 102, 104 are illustrated to show the respective scanning of each laser beam 31 and 33 in the fast-scan direction. As shown in FIG. 8A, scan line 102 is reflected from an upper half (i.e., above the optical axis 56A) of the current facet 100 while the scan line 104 is reflected from a lower half (i.e., below the optical axis 56A) of the current facet 100.

Depending on the design of the system, the scan line bow can cause the scan lines to move toward each other (barrel distortion), or away from each other (pincushion distortion). In both of these cases, the light sources (lasers) are placed on opposite sides of the optical axis 56A. Therefore, the centers of curvature of the bow scan lines are also on opposite sides of the optical axis as shown in FIG. 9B. If all the light sources are on one side of the optical axis, then all the scan lines will be imaged on the opposite side of the optical axis. Therefore, the centers of curvature of all the bow lines will also lie on the same side of the optical axis. However, each line will be bowed at a different radius or curvature. This is the source of another type of differential bow.

U.S. Patent application Ser. No. 08/174,917 to Tibor Fisli et al., filed Dec. 29, 1993, the disclosure which is incorporated herein by reference, provides for a multi-beam ROS in which the chief exit rays from the last element of the optical system to the photoreceptor are telecentric in the sagittal meridian. By providing telecentric chief exit rays, the multi-beam system becomes both tolerant to pyramidal polygon angular errors and is able to maintain adequately stable, essentially no bow performance over an acceptable depth of focus in the single station xerographic printers. In addition, by closely controlling the overall shape and orientation of the bow, single pass, multi-station systems are able to print with acceptable levels of misregistration between the various images written on the widely separated xerographic stations.

SUMMARY OF THE INVENTION

This invention provides an optical system that corrects for differential bow problems by controlling the optical areas (apertures) that laser beams pass through.

This invention also provides a method and apparatus for changing the sagittal and tangential orientation of light beams.

This invention further provides a method and apparatus that adjusts the ingoing stationary light beams on a facet of a polygon mirror such that the light beams are sagittally (i.e., vertically) aligned, close to each other, parallel with each other in both the sagittal and tangential meridian, equal distance to the optical axis and parallel with the optical axis.

Thus, this invention provides a raster scanning optical system having a light receiving member such as a photoreceptor. A first light emitting device emits a first light beam and a second light emitting device emits a second light beam. A scanning device, such as a polygon mirror, has at least one facet for reflecting the first light beam and the second light beam to the light receiving member. A light transmissive plate is located in a path of the first light beam between the first light emitting device and the scanning device. The first light beam passes through the light transmissive plate. The light transmissive plate adjusts the direction of the first light beam by a desired amount in one of a sagittal direction and a tangential direction.

This invention additionally provides a method for adjusting a position that a light beam strikes a facet of the scanning device by emitting a light beam and passing the light beam through a light transmissive plate to change at least one of a sagittal orientation and a tangential orientational of the light beam. The changed sagittal orientation and/or tangential orientation results in the light beam striking a different position on the facet of the scanning device.

Other objects, advantages and salient features of the invention will become apparent from the following detailed description taken in conjunction with the annexed drawings, which disclose preferred embodiments of the invention.

BRIEF DESCRIPTION OF THE DRAWINGS

The invention will be described in detail with reference to the following drawings in which like reference numerals refer to like elements and wherein:

FIG. 8A shows sagittal separation of light images on a polygon mirror;

FIG. 8B shows a well controlled, smaller sagittal separation of the light images, resulting from preferred embodiments of the present invention;

FIG. 8C shows sagittal and tangential separation of light images on a polygon mirror;

FIG. 8D shows a well-controlled smaller, sagittal and tangential separation of the light images, resulting from preferred embodiments of the present invention;

DETAILED DESCRIPTION OF PREFERRED EMBODIMENTS

Figure 3:
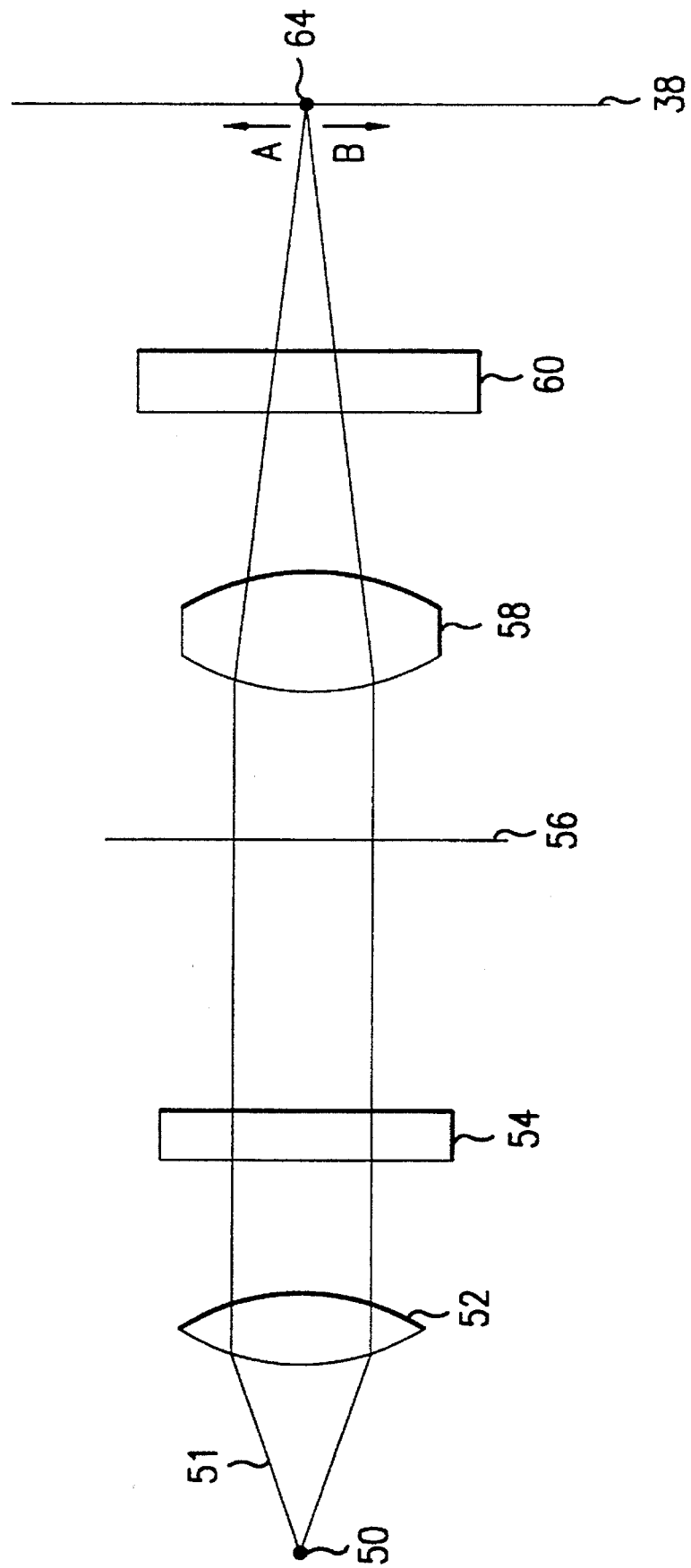
FIG. 3 is an unfolded tangential view of a raster scanning optical system.

FIG. 3 illustrates a tangential view of a well known polygon mirror raster scanning optical system. Those skilled in the art will appreciate that other raster scanning optical systems are also well known and accordingly are within the scope of this invention. As is known, a laser diode 50 generates a beam 51 that is collimated by a collimator 52. The collimated beam passes through a lens 54 that does not tangentially focus the beam on the rotating polygon mirror 56. Upon reflection from the polygon mirror 56, the beam is converged by lens 58 onto the surface of the photoreceptor 38. An $F_\Theta$ lens 58 corrects for scan linearity in a well known manner. Arrows A and B illustrate the two possible directions of tangential movement of the image spot 64 along a common sagittal/tangential image plane.

Figure 4:
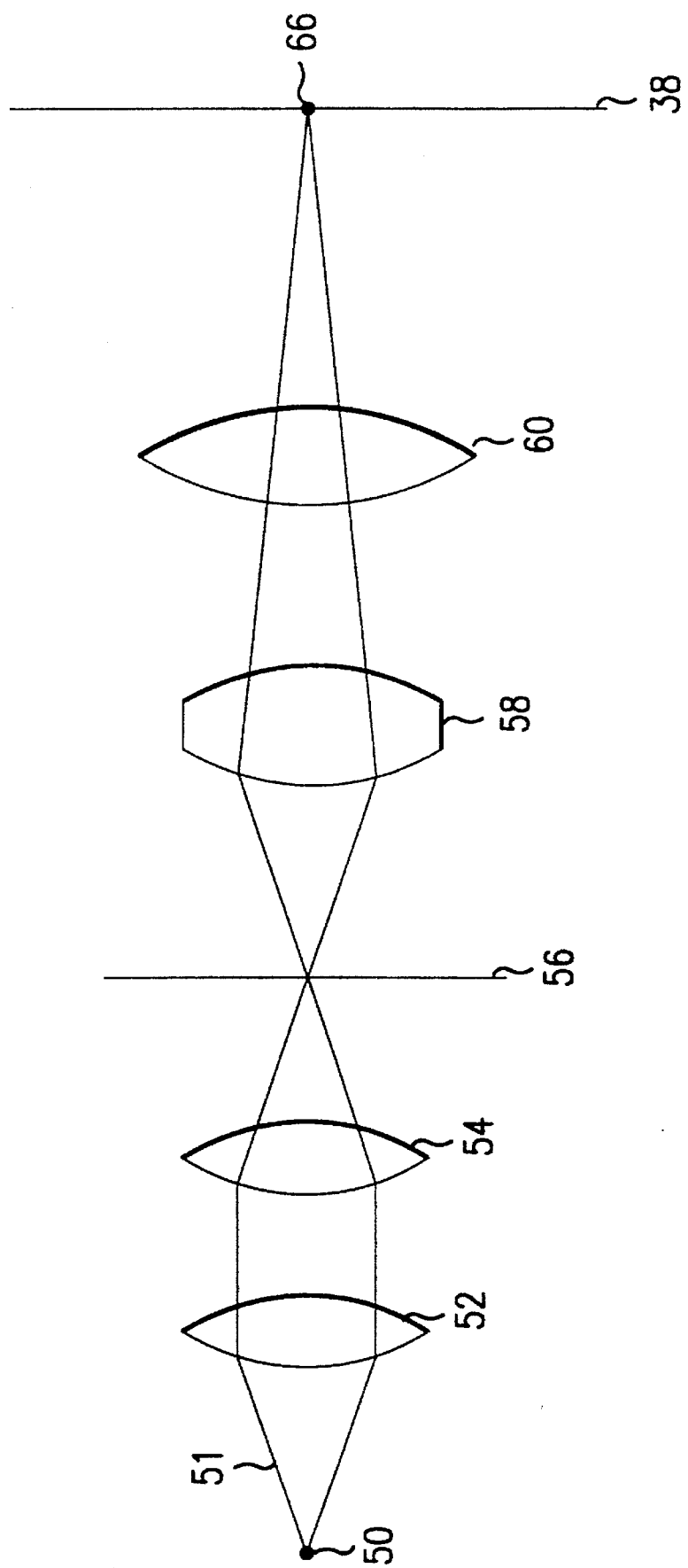
FIG. 4 is an unfolded sagittal view of a raster scanning optical system.

FIG. 4 illustrates a sagittal view of a raster scanning optical system. In the sagittal meridian, the laser diode 50 generates a laser beam 51 that is collimated by the collimator 52. The cylinder lens 54 then sagittally focuses the beam onto the current facet of the rotating polygon mirror 56. The beam diverges upon reflection from the polygon mirror 56. The lens 58 then sagittally focuses the beam onto the surface of the photoreceptor 38. The anamorphic element 60 generally provides only limited power for the sagittal focusing of the beam 51. Rather, the $F_\theta$ lens 58 controls tangential focusing and scan linearity as is well known to those skilled in the art.

For ease of illustration and discussion, the lenses 52 and 54 are hereafter referred to as pre-polygon optics and the lenses 58 and 60 are hereafter referred to as post-polygon optics. Those skilled in the art will appreciate that the pre-polygon optics and the post-polygon optics may include additional lenses and mirrors.

Polygon scanners such as that described above with reference to FIGS. 3 and 4 are well known in the art and are described, for example, in "Laser Scanning For Electronic Printing," Proceedings of the IEEE, Volume 70, No. 6, June 1982 by John C. Urbach et al., the disclosure of which is incorporated herein by reference. Other optical polygon scanner embodiments are similarly known and are within the scope of this invention.

Figure 9A:
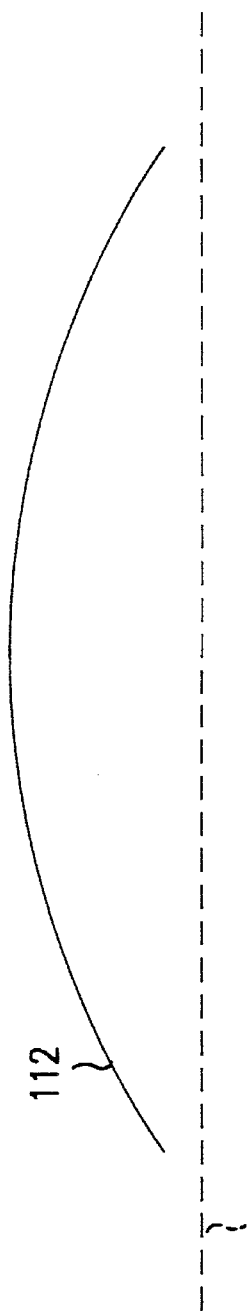
FIG. 9A shows a scan line having bow.
Figure 9B:
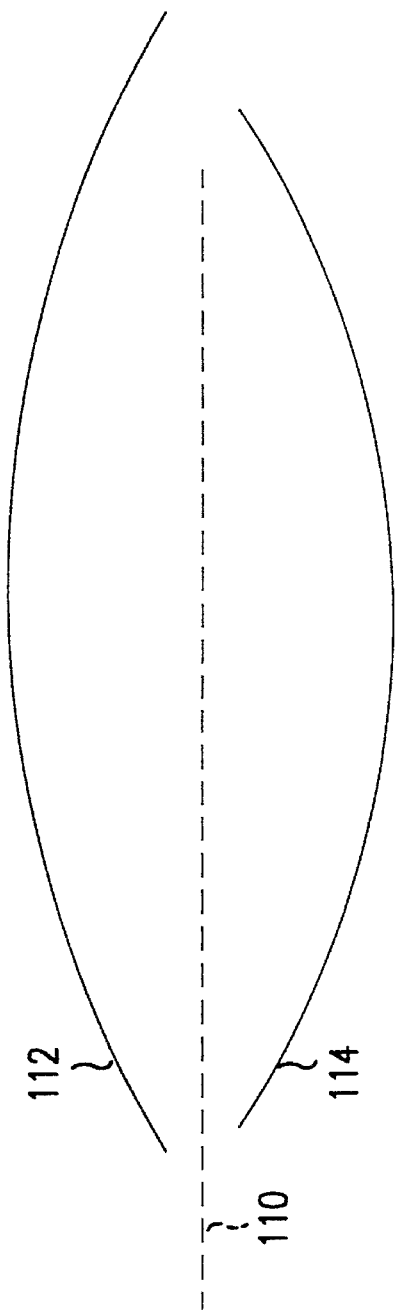
FIG. 9B shows a pair of bowed scan lines.

FIGS. 9A and 9B show bow on the surface of a photoreceptor. The ideal scan line 110 is shown as a dashed line. However, the scan line 112 resulting from the scanning of the laser beam using a system such as that illustrated in FIGS. 3 and 4 results in a scan line 112 having a curvature. Thus, when bow problems are not corrected, a printed line is curved rather than straight. Such errors are often visible to the human eye.

Figure 2:
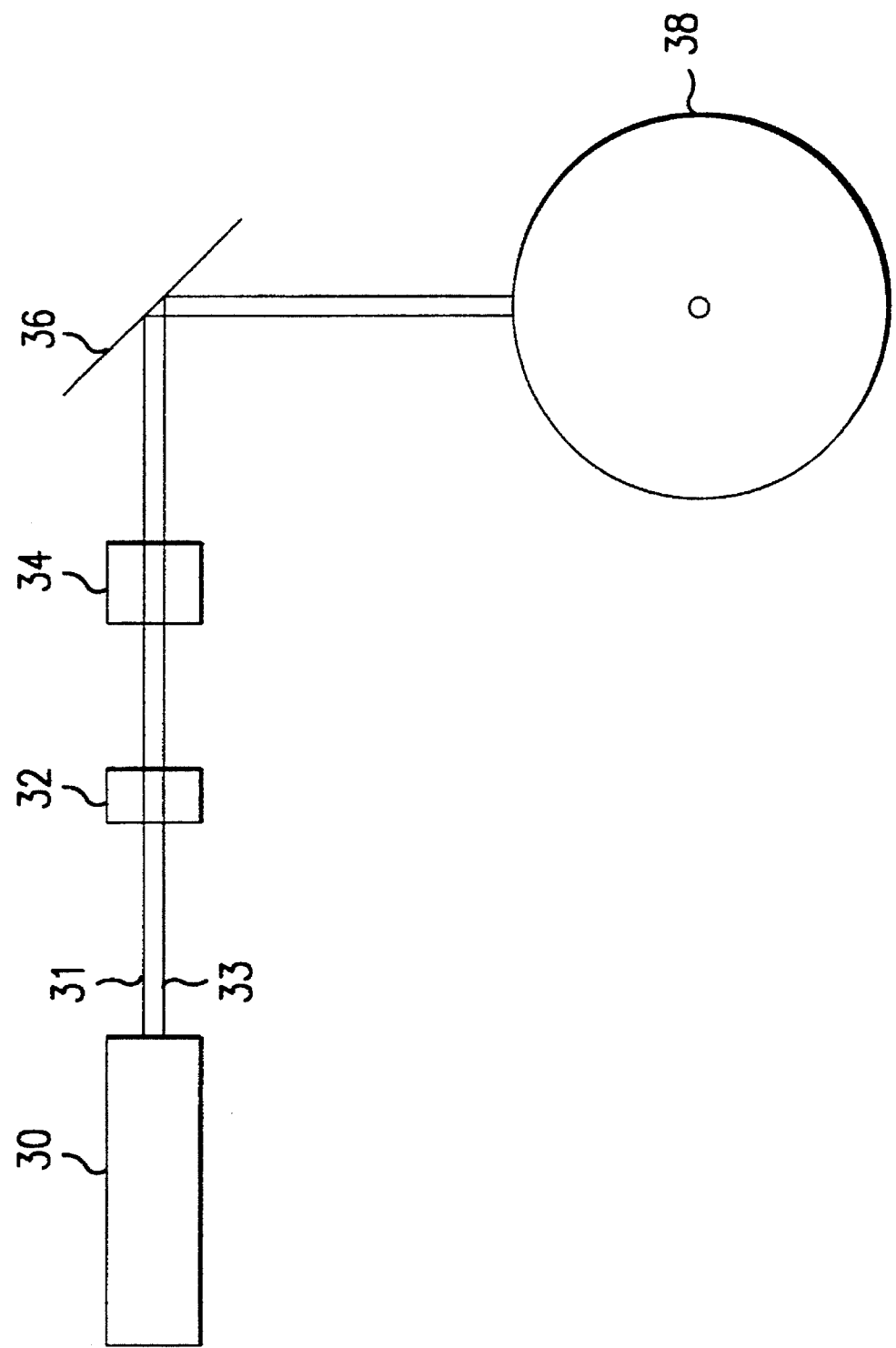
FIG. 2 is a schematic view of a dual spot single station xerographic printer.

The problem becomes even more apparent when a dual spot ROS is used such as the system illustrated in FIG. 2. A dual spot ROS simultaneously images two spots on a single photoreceptor 38. In such a ROS, two different bows may occur. In FIG. 9B, scan line 114 can have a radius of curvature that is different from the radius of curvature of the first scan line 112. A dual spot ROS in a single station printer can thus have several bow problems unless the bow is corrected.

The problems illustrated by FIG. 9B can be caused by scanning two or more laser beams across different areas of the current facet 100 of a polygon mirror 56. For example, FIG. 8A illustrates three facets of a rotating polygon mirror 56. Two scan lines 102 and 104 are shown reflecting from the current facet 100. The first scan line 102 scans across an upper part of the current facet 100 above the optical axis 56A while the second scan line 104 scans across the lower part of the current facet 100 below the optical axis 56A. Such a system may cause differential bow problems as illustrated in FIG. 9B. As explained above, the bow occurs because the magnification varies across each sagittal plane as the sagittally offset scan lines 102 and 104 propagate through the optical system.

Figure 5:
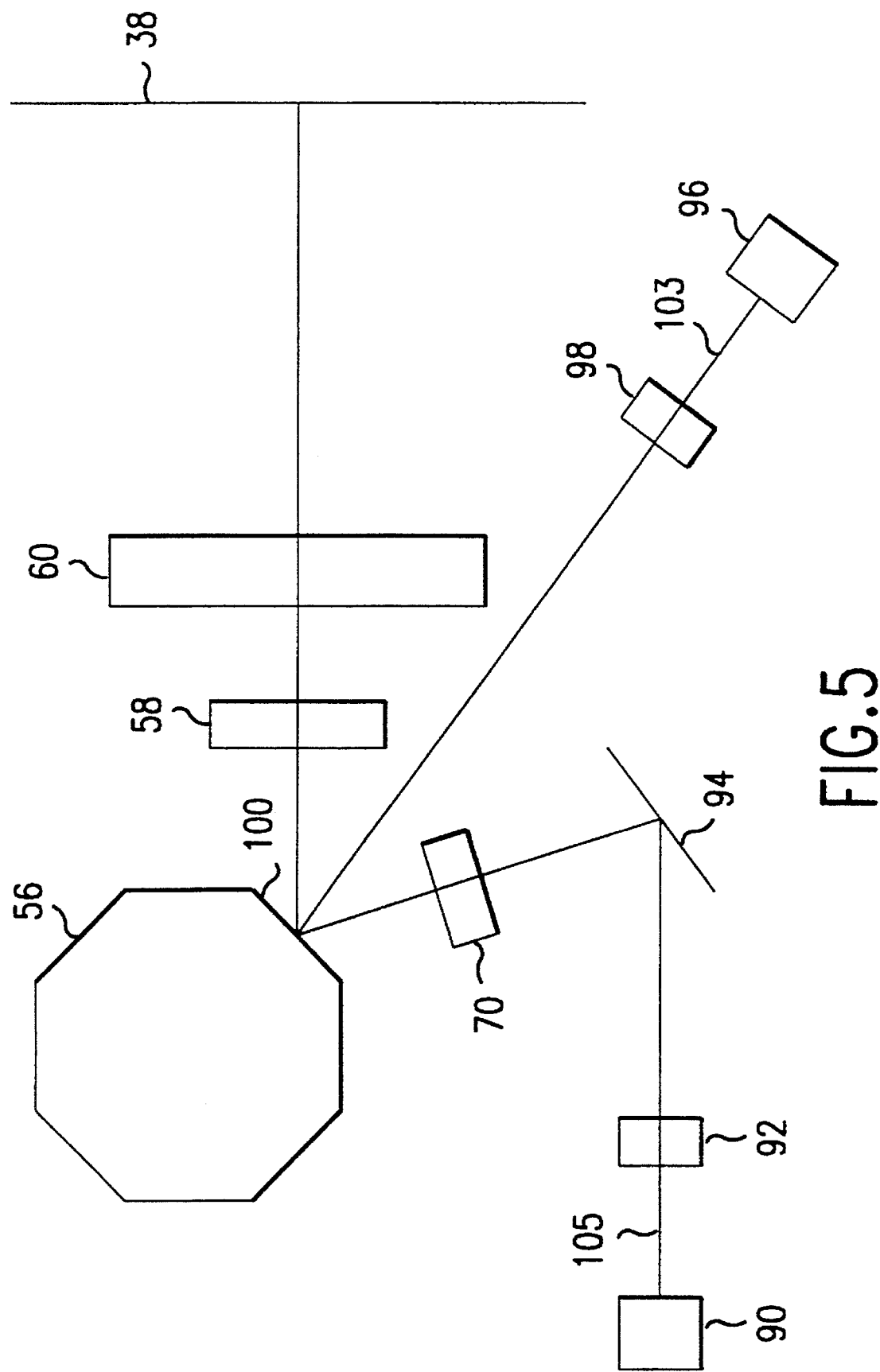
FIG. 5 is a schematic view of a preferred embodiment of the present invention.

FIG. 5 illustrates an apparatus for sagittally and tangentially adjusting one of two laser beams 103 and 105 prior to being deflected by a rotating polygon mirror 56. This embodiment sagittally and tangentially moves the position of one of the scan lines, such as scan line 104 (resulting from light beam 105), on the current facet 100 so that the scan lines 102 and 104 are closer together and are the same distance (d) from the optical axis 56A as illustrated in FIG. 8B. Thus, both the scan lines 102 and 104 will utilize essentially the same areas of the post-polygon optics and accordingly can be adjusted in similar manner to correct for various optical problems such as differential bow. Because both beams 103 and 105 are reflected from a same area of the polygon mirror 56, both the beams 103 and 105 will have nearly identical post-polygon magnification.

As shown in FIG. 5, two laser diodes 90 and 96 are provided on two input optical channels for generating laser beams 105 and 103 respectively. Pre-polygon optics 92 and 98 are provided along each input optical channel. In one embodiment, a mirror 94 is utilized to deflect laser beam 105. Those skilled in the art will appreciate that numerous lenses and mirrors may be utilized to correct for various problems relating to size constraints and optical path lengths. In the first input optical channel, the beam 105 passes through a glass plate 70 while the second light does not pass through the glass plate 70. The glass plate 70 is strategically adjusted by a user, preferably manually, in both a sagittal and tangential direction. Using the glass plate 70, the position of the resulting scan line 104 on the current facet 100 of the polygon mirror 56 is adjusted. Ideally, the scan line 104 is moved closer to the second scan line 102 as illustrated in FIG. 8B so that the scan line 102 and 104 are the same distance (d) from the optical axis 56A. After reflection from the polygon mirror 56, each of the beams 103 and 105 travels through the post-polygon optics such as the lens 58 and the $F_\theta$ lens 60 as described above with respect to FIGS. 3 and 4. For illustration purposes, FIG. 5 only shows a single beam reflecting from the polygon mirror 56 although it is clear that two beams are actually being reflected. As described above, each image spot is focused onto the surface of the photoreceptor 38 using the post-polygon optics (such as lenses 58 and 60).

In another embodiment, another glass plate 70 may be positioned along the second input optical channel such that the light beam 103 passes through the glass plate 70. This allows the user to also adjust the position of the resulting scan line 102 on the current facet 100. The glass plate(s) 70 may additionally adjust the resulting scan lines 102 and 104 so that the scan lines 102 and 104 on the current facet 100 are sagittally aligned, close to each other, parallel with each other, equal distance to the optical axis and parallel with the optical axis of the current facet 100.

Furthermore, those skilled in the art will appreciate that this invention is not limited to a dual spot ROS for a single station printer. Rather, numerous modifications are apparent to those skilled in the art. For example, each input channel can have more than one light beam passing through the optical channel. This therefore would result in more than one light beam being adjusted by the glass plate 70. As a further example, four or more light beams per channel can also be implemented. Additionally, three or more input channels can be provided using optics similar to that described above.

Additionally, as is well known to those skilled in the art, each of the laser diodes 90 and 96 may emit a laser diode at same or different wavelengths and same or different polarization. These beams may, or may not, be later separated to a plurality of different photoreceptors. For example, U.S. Pat. No. 5,243,359 to Fisli separates four different wavelengths (each having a different wavelength) to send each beam to a separate photoreceptor. Additionally, U.S. application Ser. No. 07/948,530 to James Appel et al., filed Sep. 22, 1992, the disclosure which is incorporated herein by reference, discloses one system that separates laser beams based on both the wavelength and the polarization of each of the laser beams. Those skilled in the art will appreciate that many different embodiments of laser diodes, wavelengths, polarizations and photoreceptors can be used in accordance with this invention.

Figure 6:
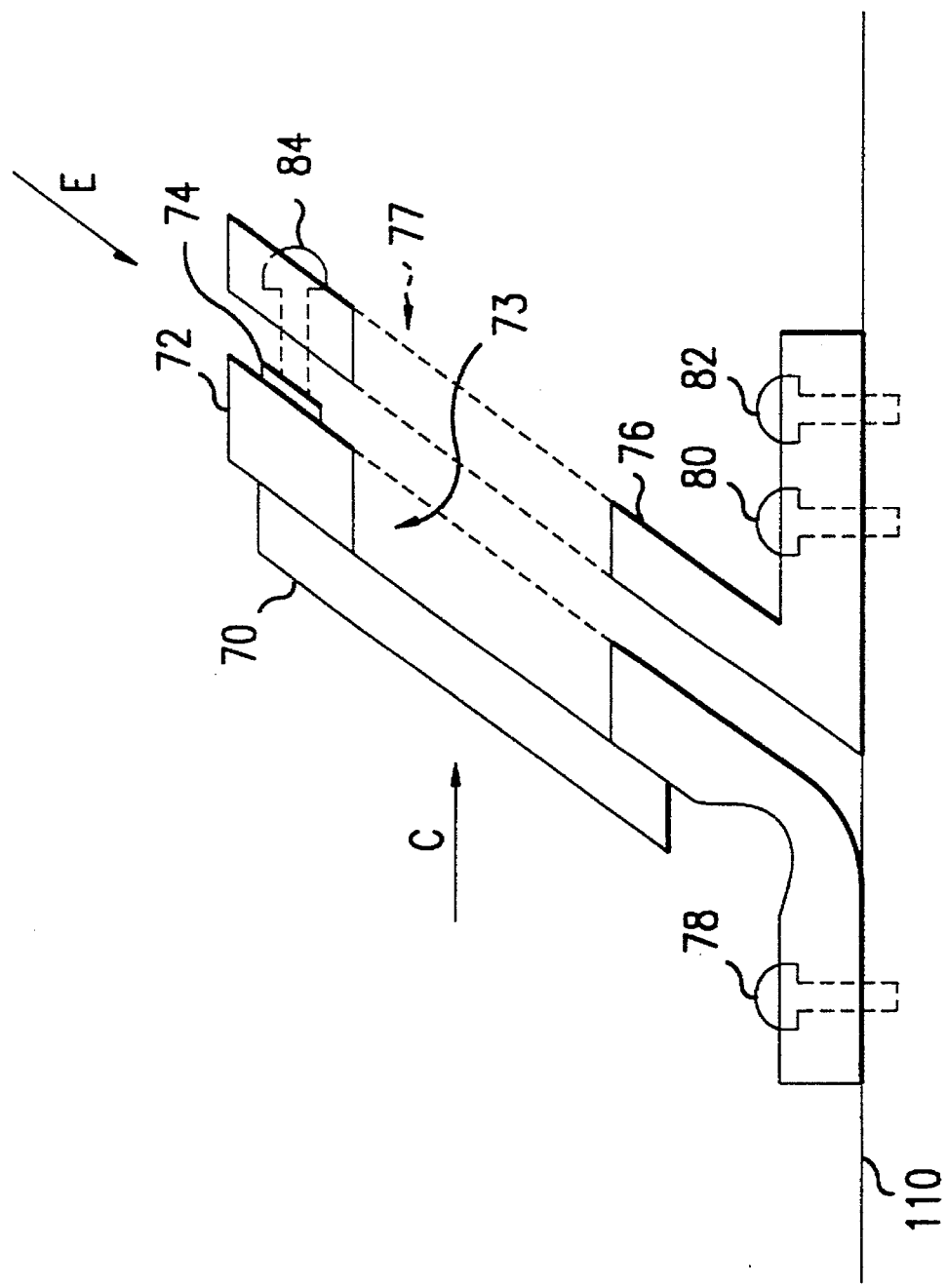
FIG. 6 is a side view of a preferred embodiment of a parallel glass plate and adjusting device.

FIG. 6 illustrates a side view of the glass plate 70 and its corresponding holding member 72. A holding member 72 securely holds the glass plate 70 using cement or similar type of adhesive. The holding member 72 (and adjusting device 76) has an aperture 73 (and 77) allowing the light beam 105 to pass through the glass plate 70 in a direction of arrow C. Thus, the holding member 72 is preferably made of one piece. The holding member 72 is preferably attached to a mounting board 110 and adjusted to a predetermined angle or tilt position relative to the mounting board 110 using a pivoting screw 78. The holding member 72 is biased in a direction of the arrow C such that the holding member 72 will always be preloaded in a direction of the arrow C.

An adjustment device 76 is provided on a rear side of the holding member 72. The adjustment device 76 includes a centrally located aperture 77 allowing the light beam 105 to pass through in a direction of the arrow C. The adjusting device 76 is preferably attached to the mounting board 110 using two screws 80 and 82. Additionally, the adjusting device 76 includes a setting screw 84 that adjusts a tilted position of the holding member 72 relative to the mounting board 110 and thus a tilted position of the glass plate 70. The setting screw 84 is threaded through the adjusting device 76 to abut against a stopper 74. When the setting screw 84 is rotated, the screw 84 abuts against the stopper 74 to push the holding member 72 in a direction opposite to that of arrow C. This causes the top end of the glass plate 70 to tilt in a direction opposite that of arrow C and therefore causes a controlled parallel sagittal adjustment of the light beam 105. The sagittal adjustment results in the positional movement of the scan line 104 as illustrated in FIGS. 8A and 8B. Thus, by properly adjusting the setting screw 84, the scan line 104 can be appropriately adjusted on the current facet 100 of the polygon mirror 56.

Figure 7:
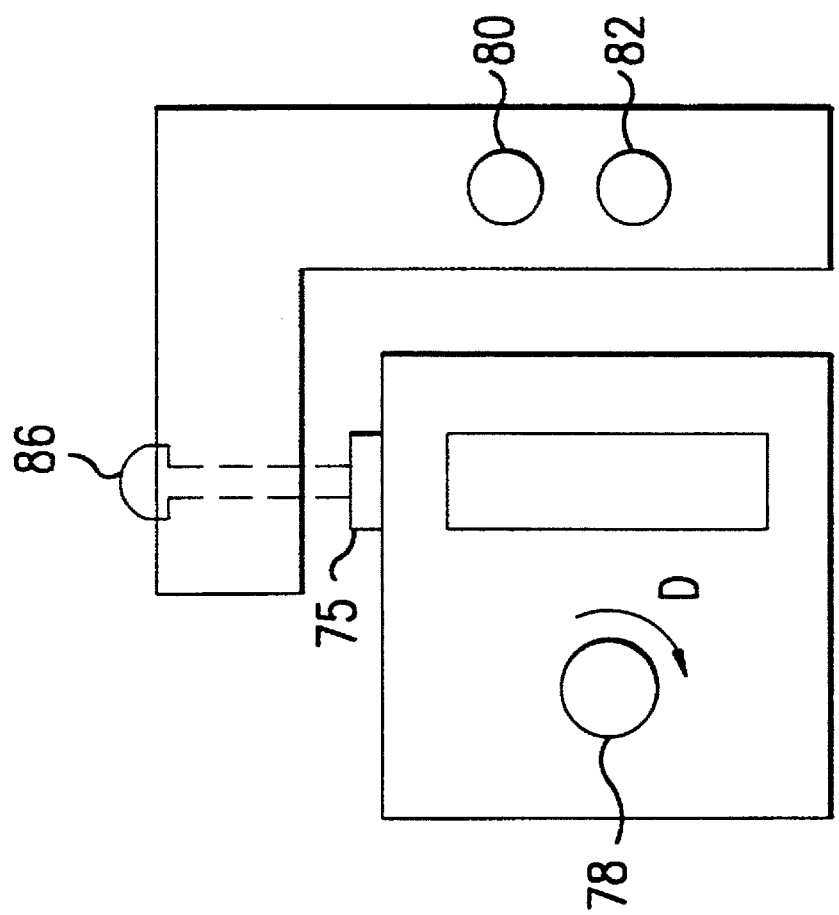
FIG. 7 is a view of FIG. 6 taken from the direction of arrow E.

FIG. 7 illustrates a view taken at an angle along arrow E in FIG. 6. FIG. 7 illustrates how tangential movement of the scan lines occur. The holding member 72 and the glass plate 70 rotate in a direction of arrow D around the screw 78. A second setting screw 86 abuts against the stopper 75 to control the pivotal rotation. By rotating the holding member 72 using the setting screw 86, the light beam 105 passing through the glass plate 70 may be tangentially adjusted in a controlled manner.

Figure 1:
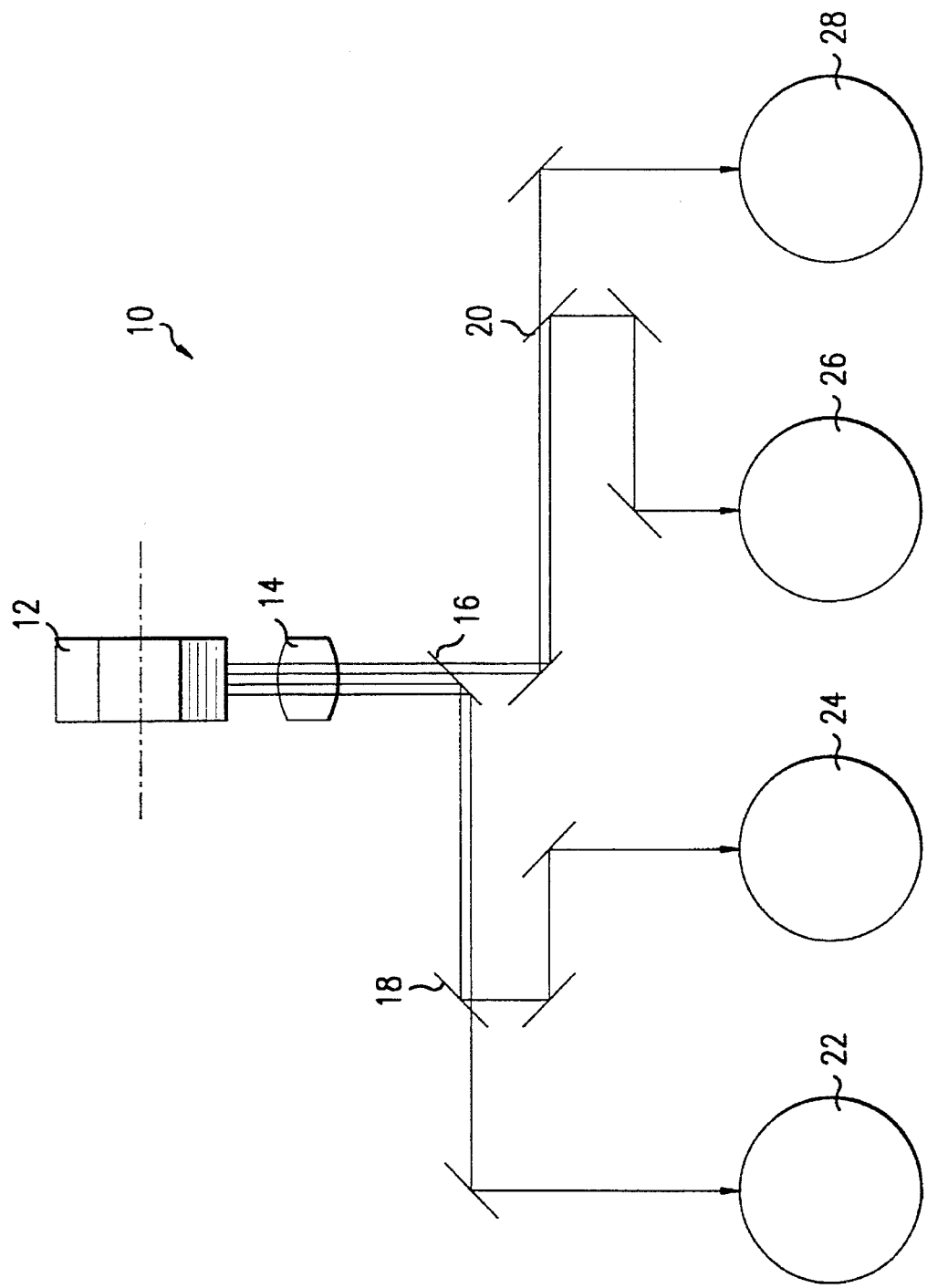
FIG. 1 is a schematic view of a conventional multi-station raster output scanner.

By tangentially adjusting the light beam 105, the resulting scan line 104 of the current facet 100 of the polygon mirror 56 may be tangentially adjusted. This is shown by the differences between FIGS. 8C and 8D. FIG. 8C shows the two scan lines 102 and 104 being sagittally and tangentially offset on the current facet 100. In FIG. 8D, the scan line 104 is sagittally adjusted using the setting screw 84 and is tangentially adjusted using the setting screw 86. These sagittal and tangential adjustments essentially align the light images on the current facet 100. Thus, each of the light images will pass through nearly identical areas of the post-polygon optics. As described above, each of the beams 103 and 105 will then be focused on a common photoreceptor 38 or the beams will be separated based on wavelength and/or polarization and directed to different photoreceptors such as that shown in FIG. 1.

Figure 10:
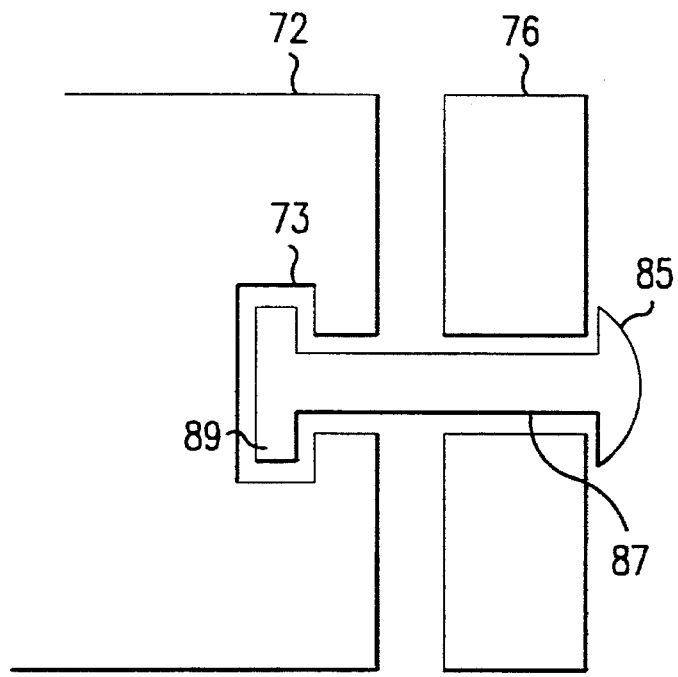
FIG. 10 shows a side view of another embodiment of a setting screw used in accordance with preferred embodiments of the present invention.

Other embodiments of the holding member 72, and the adjusting device 76 are also within the scope of this invention. For example, the setting screws 84 and 86 may abut directly against the holding member 72 rather than the stopper 74. Additionally, FIG. 10 shows another embodiment of the setting screw 84. In this embodiment, the screw 84 includes a head part 85, a threaded part 87 received within the adjusting device 76 and a recessed part 89 recessed within the holding member 72. The recessed part 89 is T-shaped and round headed and accordingly fits within a recess 73 of the holding member 72. The setting screw 86 may additionally be configured such as that illustrated in FIG. 10.

The glass plate 70, using the holding member 72 and the adjusting device 76, sagittally and tangentially adjusts a light beam in a well-controlled manner prior to reflection from the current facet 100 of a polygon mirror 56. As described above, these adjustments are preferably performed to avoid problems of differential bow in dual spot single photoreceptor systems. However, the sagittal and tangential adjustments may be used for any number of other reasons as those skilled in the art will recognize.

Figure 11:
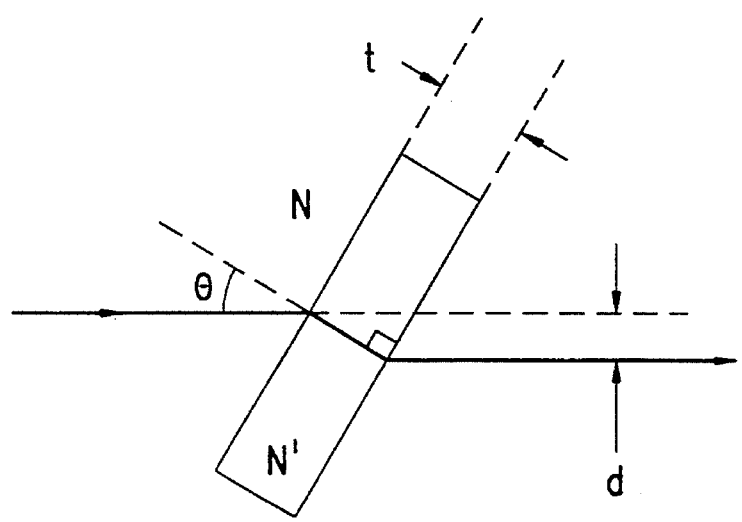
FIG. 11 shows a light beam passing through a planar glass plate.

The glass plate 70 is preferably made of parallel glass. Other, similar substances may be used. For proper system function, the clear aperture area of the glass plate 70 must be parallel within a few minutes of arc, be optically flat within about ⅕ th of the operating wavelength, be free of diggs, scratches, bubbles, and should have a minimum of 98% transmission (with antireflection coating on both side) at the operating wavelength. The amount of parallel displacement of a light beam using such a parallel glass plate for small angles can be described by the following formula:

$$d = t\sin(\ominus)(N'-1)/N' \qquad \text{Eq. 1}$$

where:

d = parallel displacement
t = plate thickness
$\ominus$ = angle of incidence
N = index refraction of air (1.0)
N' = index refraction of glass The parallel displacement (d) is illustrated in FIG. 11.

For example if a glass plate 70 has a thickness of 2 millimeters and an index of 1.5, a 5° tilt will produce 58 micron displacement. Thus, such a glass plate incorporated into a raster scanning system should have a wide range of use. If greater correction is required, than a thicker plate, a higher index of the plate or a greater tilt angle can be used.

Figure 12B:
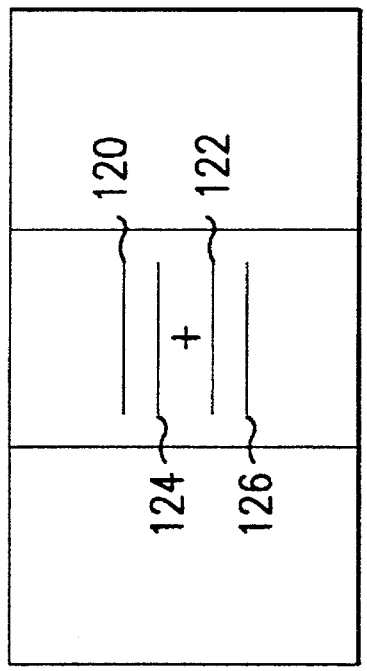
FIG. 12B shows a well controlled, smaller separation of the two pair of light images, resulting from preferred embodiments of the present invention.
Figure 12A:
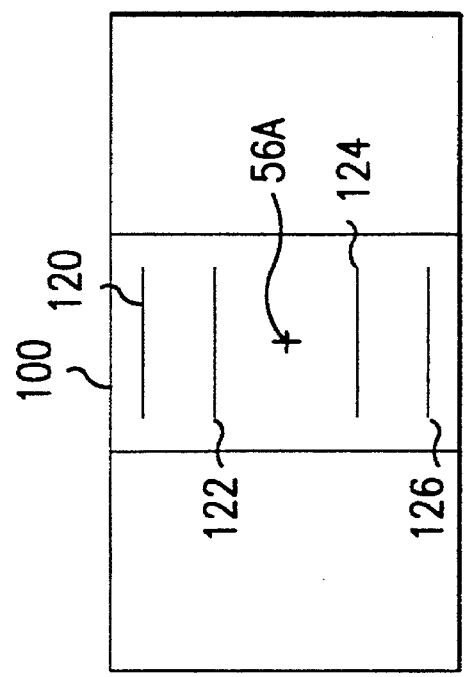
FIG. 12A shows a two pair of light images on a polygon mirror.

FIG. 12A illustrates two pair of input scan lines on the current facet 100 of the polygon mirror 56. The first pair comprises scan lines 120 and 122 located above the optical axis 56A. The second pair comprises scan lines 124 and 126 located below the optical axis. Preferably the scan lines 120 and 122 originate from a first optical channel while the scan lines 124 and 126 originate from a second optical channel. As can be seen in FIG. 12B, the first pair of scan lines 120 and 122 are adjusted such that scan line 120 is above the optical axis 56A while the scan line 122 is below the optical axis 56A. The second pair of scan lines 124 and 126 are adjusted such that scan line 124 is above the optical axis 56A while the scan line 126 is below the optical axis 56A. This staggering of scan lines on the current facet can be used for interlacing. Additionally, staggering can be used to reduce beam separation and thus differential bow. FIG. 12B, the sagittal separation between each pair of scan lines is narrowed using a glass plate 70 in each input optical channel. This is especially useful when close separation is needed but it is not permitted by the laser fabrication process.

While the invention has been described with reference to specific embodiments, the description of the specific embodiments is illustrative only and is not to be construed as limiting the scope of the invention. Various other modifications and changes may occur to those skilled in the art without departing from the spirit and scope of the invention.

What is claimed is:

1. A raster scanning optical system comprising:

at least one light emitting device that emits a light beam;

a rotatable reflecting device that reflects the light beam to form a scan line;

an optic device including at least a collimator lens located in a path of the light beam between the light emitting device and the reflecting device; and a planar light transmissive plate separate from the optic device, located in a path of the light beam between the optic device and the reflecting device, the planar light transmissive plate receiving the light beam having a fixed width from the optic device, the light beam passing through said planar light transmissive plate without altering the fixed width of the light beam, the planar light transmissive plate changing at least one of a sagittal orientation and a tangential orientation of the light beam as the light beam passes through the planar light transmissive plate to the reflecting device.

2. The raster scanning optical system of claim 1, wherein the at least one light emitting device includes a first light emitting device and a second light emitting device respectively emitting a first light beam and second light beam; the second light beam reflecting from a reflecting portion of the reflecting device, the light transmissive plate located in the path of the first planar light beam to adjust the orientation of the first light beam relative to the second light beam such that the first light beam is directed to a new reflecting position on the reflecting device that is closer to the reflecting position of the second light beam on the reflecting device.

3. A raster scanning optical system comprising:

a light receiving member;

a first light emitting device that emits a first light beam;

a second light emitting device that emits a second light beam;

a scanning device having at least one facet for reflecting the first light beam and the second light beam to the light receiving member and scanning the first light beam and the second light beam across the light receiving member;

an optic device including at least a collimator lens located in a path of the first light beam between the first light emitting device and the scanning device; and a planar light transmissive plate separate from the optic device, located in a path of said first light beam between said optic device and said scanning device, the planar light transmissive plate receiving the first light beam having a fixed width from the optic device, said first light beam passing through the planar light transmissive plate without altering the fixed width of the first light beam, the planar light transmissive plate adjusting a direction of said first light beam by a desired amount in one of a sagittal direction and a tangential direction.

4. The raster scanning optical system of claim 3, wherein the planar light transmissive plate corrects for differential bow on the light receiving member.

5. The raster scanning optical system of claim 3, wherein the planar light transmissive plate comprises a planar glass plate having a first surface for receiving the first light beam from the first light emitting device and a second surface facing an opposite direction from the first surface, the first planar light beam passing from the second surface toward the scanning device in the one of the adjusted sagittal direction and the adjusted tangential direction.

6. The raster scanning optical system of claim 3, further comprising:

a first input optical channel for directing the first light beam from the first light emitting device to the scanning device, the first input optical channel including the light transmissive plate; and a second input optical channel for directing the second light beam from the second light emitting device to the scanning device, the second input optical channel including a collimating lens and a cylindrical lens.

7. The raster scanning optical system of claim 3, wherein the planar light transmissive plate adjusts an orientation of the first light beam relative to the second light beam such that a first light beam reflecting position on the at least one facet of the scanning device for reflecting the first light beam and the second light beam is directed closer to a second light beam reflecting position on the at least one facet of the scanning device for reflecting the first light beam and the second light beam.

8. The raster scanning optical system of claim 7, wherein the at least one facet of the scanning device for reflecting the first light beam and the second light beam has an optical axis, the planar light transmissive plate adjusting the orientation of the first light beam such that the first light beam is directed to the first light beam reflecting position on a same side of the optical axis as the second light beam reflecting position.

9. The raster scanning optical system of claim 3, further comprising:

a holding member attached to and supporting the light conductive plate at an initial position; and an adjusting device, contacting the holding member, for adjusting the position of the planar light transmissive plate to adjust the direction of the first light beam in the at least one of the sagittal direction and the tangential direction.

10. The raster scanning optical system of claim 9, wherein the adjusting device includes at least one setting screw for adjusting at least the sagittal direction an the tangential direction of the first light beam.

11. The raster scanning optical system of claim 3, further comprising an output optical system, located in a path of the first light beam and the second light beam between the scanning device and the light receiving member, the output optical system focusing the first light beam and the second light beam on the light receiving member.

12. The raster scanning optical system of claim 11, wherein the output optical system comprises an $F_\Theta$ optical element.

13. The raster scanning optical system of claim 3, wherein the first light emitting device and the second light emitting device each are lasers.

14. The raster scanning optical system of claim 3, wherein the scanning device is a multi-faceted rotating polygon mirror.

15. The raster scanning optical system of claim 3, wherein the light receiving member is a photoreceptor.

16. The raster scanning optical system of claim 3, wherein the planar light transmissive plate adjusts a reflecting position of the first light beam on the scanning device.

17. The raster scanning optical system of claim 3, wherein the planar light transmissive plate sagittally adjusts a reflecting position of the first light beam on the scanning device closer to a reflecting position of the second light beam on the scanning device.

18. The raster scanning optical system of claim 3, wherein the planar light transmissive plate sagittally aligns the first light beam and the second light beam on the scanning device.

19. The raster scanning optical system of claim 3, wherein the planar light transmissive plate tangentially aligns the first and second light beams on the scanning device.

20. The raster scanning optical system of claim 3, wherein the planar light transmissive plate is a planar glass plate.

21. The raster scanning optical system of claim 3, wherein the at least one facet of the scanning device has an optical axis, the planar light transmissive plate adjusts the first light beam such that the optical axis is centered between a reflecting position of the first light beam on the at least one facet and a reflecting position of the second light beam on the at least one facet.

22. The raster scanning optical system of claim 3, further comprising an additional planar light transmissive plate, located in a path of said second light beam between said second light emitting device and said scanning device, said second light beam passing through the additional planar light transmissive plate, the additional planar light transmissive plate adjusting a direction of said second light beam by a desired amount in one of a sagittal direction and a tangential direction.

23. A multi-station printer comprising:

at least two photoreceptors;

a first light emitting device for emitting a first light beam;

a second light emitting device for emitting a second light beam;

a scanning device for directing the first light beam to a first photoreceptor and for directing the second light beam to a second photoreceptor;

an optic device including at least a collimator lens located in a path of said first light beam between the first emitting device and the scanning device; and a planar light transmissive plate separate from the optic device, located in a path of said first light beam between the optic device and the scanning device, the planar light transmissive plate receiving the first light beam having a fixed width from the optic device the first light beam passing through the planar light transmission without altering the fixed width of the first light beam, the planar light transmissive plate adjusting a direction of the first light beam in one of a sagittal direction and a tangential direction.

24. A method for adjusting a position that a light beam strikes a scanning device for scanning the light beam across an imaging device, the method comprising the steps of:

emitting a light beam;

passing the light beam through an optic device including at least a collimator lens;

reflecting the light beam from the scanning device toward the imaging device; and passing the light beam through a planar light transmissive plate to change at least one of a sagittal orientation and a tangential orientation of the light beam after the light beam has passed through the optic device and before the light beam reaches the scanning device, the changed one of the sagittal orientation and the tangential orientation adjusting a reflecting location of the light beam along the scanning device, the planar light transmissive plate receiving the light beam having a fixed width from the optic device, said light beam passing through said planar light transmissive plate without altering the fixed width of the light beam.

25. A method for scanning at least two light beams across a light receiving member, the method comprising the steps of:

directing a first light beam toward a reflecting device;

directing a second light beam toward the reflecting device;

passing the first light beam through an optic device including at least a collimator lens;

after passing the first light beam through the optic device and before scanning the first light beam using the reflecting device, passing the first light beam through a planar light transmissive plate to change at least one of a sagittal orientation and a tangential orientation of the first light beam by a desired amount, said planar light transmissive plate receiving the first light beam having a fixed width from the optic device, said first light beam passing through the planar light transmissive plate without altering the fixed width of the first light beam; and after passing the first light beam through the planar light transmissive plate, scanning the first light beam and the second light beam across the light receiving member using the reflecting device.

26. The method of claim 25, wherein the step of passing the first light beam through the planar glass plate comprises adjusting the sagittal orientation of the first light beam so that the first light beam and the second light beam are scanned by the reflecting device through substantially a same area of an output optical channel.

27. The method of claim 25, wherein the passing step directs the first light beam to a first light beam reflecting position on the reflecting device that is closer to a second light beam reflecting position on the reflecting device.

* * * * *